(12) United States Patent
Feustel et al.

(10) Patent No.: US 10,907,654 B2
(45) Date of Patent: Feb. 2, 2021

(54) ROTOR DISK FOR AN EXHAUST TURBOCHARGER, EXHAUST TURBOCHARGER AND METHOD FOR BALANCING A ROTOR ASSEMBLY FOR AN EXHAUST TURBOCHARGER

(71) Applicants: IHI Charging Systems International GmbH, Heidelberg (DE); IHI Charging Systems International Germany GmbH, Ichtershausen (DE)

(72) Inventors: Diana Feustel, Günthersleben-Wechmar (DE); Ingo Zähringer, Radisleben (DE); Torsten Gramsch, Langewiesen (DE); Martin Kreschel, Mannheim (DE)

(73) Assignees: IHI Charging Systems International GmbH, Ichtershausen (DE); IHI Charging Systems International Germany GmbH, Ichtershausen (DE)

( * ) Notice: Subject to any disclaimer, the term of this patent is extended or adjusted under 35 U.S.C. 154(b) by 68 days.

(21) Appl. No.: 16/304,465

(22) PCT Filed: Jun. 29, 2017

(86) PCT No.: PCT/EP2017/000774
§ 371 (c)(1),
(2) Date: Nov. 26, 2018

(87) PCT Pub. No.: WO2018/007000
PCT Pub. Date: Jan. 11, 2018

(65) Prior Publication Data
US 2019/0145430 A1 May 16, 2019

(30) Foreign Application Priority Data
Jul. 7, 2016 (DE) .................. 10 2016 112 521

(51) Int. Cl.
*F01D 25/04* (2006.01)
*F04D 29/66* (2006.01)
(Continued)

(52) U.S. Cl.
CPC ........... *F04D 29/662* (2013.01); *F01D 5/027* (2013.01); *F02C 6/12* (2013.01); *G01M 1/34* (2013.01);
(Continued)

(58) Field of Classification Search
CPC ...... F04D 29/662; F01D 5/10; F05D 2266/96; G01M 1/34
See application file for complete search history.

(56) References Cited

U.S. PATENT DOCUMENTS 9,217,331 B1 * 12/2015 Yellapragada ........ F16F 15/322
10,465,713 B2 * 11/2019 Seike ................... F04D 29/666
(Continued)

FOREIGN PATENT DOCUMENTS

DE 102010048099 A1 4/2012
DE 102015219374 A1 4/2017
(Continued)

*Primary Examiner* — Ninh H. Nguyen
(74) *Attorney, Agent, or Firm* — Smartpat PLC

(57) ABSTRACT

A rotor disk for an exhaust turbocharger is mounted in a housing of the exhaust turbocharger able to rotate about an axis of rotation. The rotor disk has a disk hub comprising a disk back and a disk front remote from the disk back. A plurality of rotor disk blades are formed on the disk hub in a manner extending between the disk back and the disk front. A balancing mark is arranged in a blade channel formed between a first blade of the plurality of rotor disk blades and a second blade, arranged adjacent to the first blade, of the plurality of rotor disk blades. A width of the balancing mark is less than a length of the balancing mark. The disclosure also relates to an exhaust turbocharger com- (Continued)

prising such a rotor disk and to a method for balancing a rotor assembly for such an exhaust turbocharger.

6 Claims, 1 Drawing Sheet

(51) Int. Cl.
    *F01D 5/02*           (2006.01)
    *F02C 6/12*           (2006.01)
    *G01M 1/34*         (2006.01)

(52) U.S. Cl.
    CPC .... *F05D 2220/40* (2013.01); *F05D 2250/193* (2013.01); *F05D 2250/70* (2013.01)

(56) References Cited

U.S. PATENT DOCUMENTS

| | | | |
|---|---|---|---|
| 2006/0250033 A1* | 11/2006 | Vasilescu | F04D 29/662 310/62 |
| 2015/0322793 A1 | 11/2015 | Takabatake et al. | |
| 2016/0363134 A1 | 12/2016 | Seike et al. | |
| 2017/0009585 A1* | 1/2017 | Maeda | F01D 5/027 |
| 2018/0313366 A1 | 11/2018 | Lehmayr et al. | |

FOREIGN PATENT DOCUMENTS

| | | |
|---|---|---|
| EP | 3115617 A1 | 1/2017 |
| WO | 2014008117 A1 | 1/2014 |
| WO | 2015132896 A1 | 9/2015 |

\* cited by examiner

ROTOR DISK FOR AN EXHAUST TURBOCHARGER, EXHAUST TURBOCHARGER AND METHOD FOR BALANCING A ROTOR ASSEMBLY FOR AN EXHAUST TURBOCHARGER

TECHNICAL FIELD

The invention relates to a rotor disk for an exhaust turbocharger, to an exhaust turbocharger, and to a method for balancing a rotor assembly for an exhaust turbocharger.

BACKGROUND

German patent application publication DE 10 2010 048 099 A1 discloses a rotor assembly comprising a rotor disk of an exhaust turbocharger. The rotor disk has rotor disk blades which are arranged on a disk hub, comprising a disk back and a disk front remote from the disk back. An arcuate balancing mark is introduced into the rotor disk on the disk back.

It is likewise known to introduce balancing marks into the hub between the disk back and the disk front. In a blade channel formed between two rotor disk blades, in the channel base thereof the balancing mark is arranged. However, in certain circumstances an insufficient amount of removable mass may be available in this region because preferably the balancing mark is placed in the region of a largest disk diameter of the rotor disk. In the worst case scenario, this then results in an increased reject rate.

In the case of balancing marks which are produced by milling, high material stresses occur in the base of the balancing mark, i.e. in the region of the smallest thickness of the rotor disk. This means that, in order to reduce or eliminate the imbalance, a sufficient amount of material is removed over the thickness of the rotor disk by material removal.

SUMMARY

The object of the present invention is to provide an improved rotor disk for an exhaust turbocharger, such an exhaust turbocharger and a method for balancing a rotor assembly of such an exhaust turbocharger, thus facilitating improved balancing.

This object is achieved by a rotor disk for an exhaust turbocharger, by an exhaust turbocharger, and by a method for balancing a rotor assembly for an exhaust turbocharger as claimed.

A first aspect of the invention relates to a rotor disk for an exhaust turbocharger which is mounted in a housing of the exhaust turbocharger so as to be able to rotate about an axis of rotation. The rotor disk has a disk hub comprising a disk back and a disk front remote from the disk back. Formed in a manner extending between the disk hub and the disk back is a plurality of rotor disk blades, wherein a balancing mark is arranged in a blade channel formed between a first blade of the plurality of rotor disk blades and a second blade, arranged adjacent to the first blade, of the plurality of rotor disk blades. In accordance with the invention, a width of the balancing mark is less than a length of the balancing mark. In other words, this means that the balancing mark is not a point-shaped balancing mark as in the prior art, the width of which corresponds substantially to its length, but instead it is a balancing mark which extends in the circumferential direction of the rotor disk.

The advantage is an increase in the size of the balancing mark, whereby a stress maximum which occurs in the balancing mark is displaced to an edge of the balancing mark which, in comparison with the prior art, is formed in a region of greater thickness of the rotor disk. This results in an increase in the durability and long-term loading capacity of the rotor disk.

By reason of this design of the balancing mark, a rotor assembly, to which the rotor disk is allocated and which comprises a shaft, to which the rotor disk is to be connected or is connected for conjoint rotation therewith, can be balanced in a particularly effective manner such that the rotor assembly can perform a particularly effective and at least almost imbalance-free rotational movement during the operation of the exhaust turbocharger.

In one embodiment of the rotor disk in accordance with the invention, the balancing mark is curved. Preferably, it is adapted to an equalization radius. The equalization radius corresponds to a radius starting from the axis of rotation of the rotor disk to the designated position of the balancing mark. Since the balancing mark is provided for reducing or eliminating an imbalance during the rotating operation of the rotor disk, a form of the balancing mark which is adapted to the rotating movement is to be preferred.

A second aspect of the invention relates to an exhaust turbocharger, in particular for an internal combustion engine, comprising a rotor assembly which is rotatably mounted in a housing and comprises a shaft and at least one inventive rotor disk which is connected to the shaft for conjoint rotation therewith. Advantageous embodiments of the first aspect of the invention are to be considered to be advantageous embodiments of the second aspect of the invention and vice versa.

The rotor assembly of the exhaust turbocharger has a particularly calm rotational movement as a result of the advantageous balancing of the rotor disk and in particular of the rotor assembly, which is conducive to an efficient operation of the exhaust turbocharger and to a long service life thereof.

A third aspect of the invention relates to a method for balancing a rotor assembly, which is to be mounted rotatably in a housing of an exhaust turbocharger, in particular a rotor disk of the rotor assembly which has a plurality of rotor disk blades on a disk hub of the rotor disk. Formed between at least one first blade of the plurality of rotor disk blades and a second blade, adjacent to the first blade, of the plurality of rotor disk blades is a blade channel comprising a channel base in which a balancing mark is formed. In accordance with the invention, provision is made that in order to produce the balancing mark having a length greater than its width, a tool or the rotor disk is moved in the circumferential direction of the rotor disk. The advantage is that by means of the movement of the balancing mark which differs from a point-shaped balancing mark, whose length corresponds substantially to its width, a substantially pivoting movement of the tool or of the rotor disk is produced in a designated, adjusted x-y-position of the tool. In other words, this means that only an additional movement, the pivoting movement, of the tool or of the rotor disk or of the rotor assembly is required in order to produce the balancing mark. A change in the adjusted x-y-position of the tool is not required.

The balancing mark is produced in a cost-effective manner by a material-removal method, in other words by means of material removal, wherein preferably a milling method is used.

Further advantages, features and details of the invention will be apparent from the following description of preferred exemplified embodiments and with reference to the drawing. The features and combinations of features mentioned earlier in the description and the features and combinations of features mentioned hereinunder in the description of the figures and/or illustrated individually in the figures can be employed not only in the combination stated in each case but also in other combinations or on their own without departing from the scope of the invention. Identical or functionally identical elements are allocated identical reference signs.

DETAILED DESCRIPTION

Figure 1:
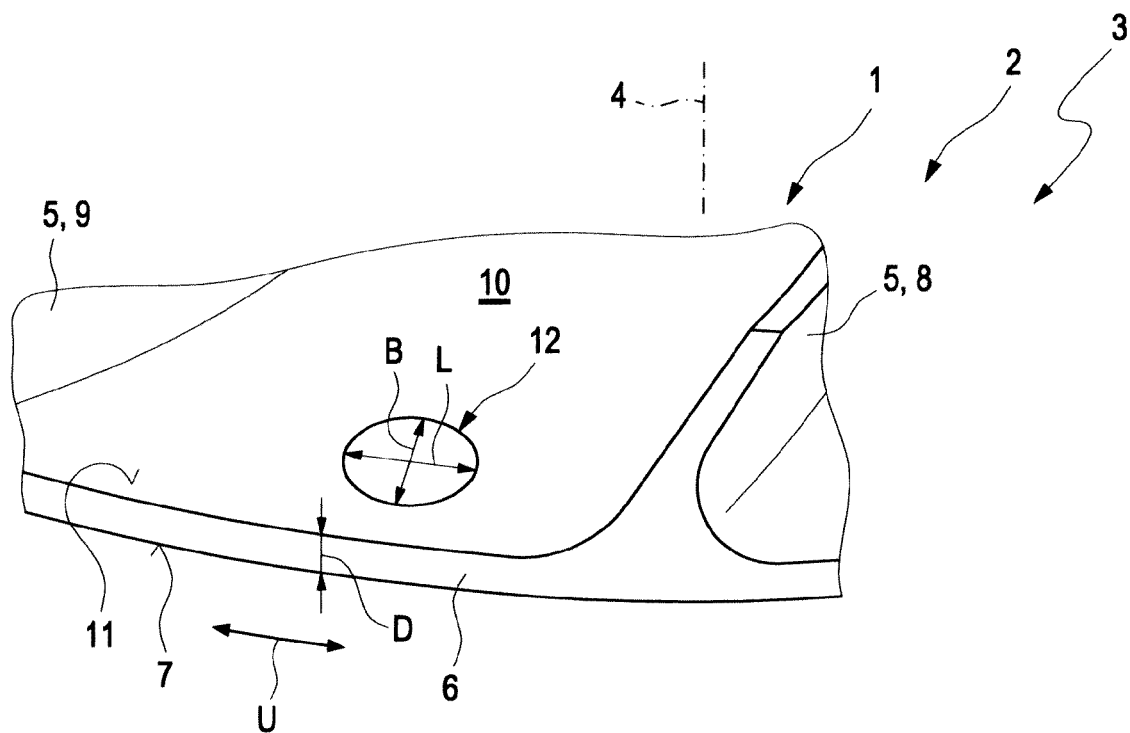
FIG. 1 shows a perspective view of a detail of a rotor disk according to the prior art.

A rotor disk 1 of a rotor assembly 2 for an exhaust turbocharger 3 according to the prior art is formed as shown in FIG. 1. The rotor disk 1 is designed in the form of a compressor wheel. The rotor assembly 2 comprises the compressor wheel 1 and a turbine wheel, not illustrated in greater detail, which is connected via a shaft, not illustrated in greater detail, to the compressor wheel 1 for conjoint rotation therewith.

The rotor assembly 2 is mounted in a bearing portion, not illustrated in greater detail, of the exhaust turbocharger 3 so as to be able to rotate about an axis of rotation 4 of the rotor assembly 2. The turbine wheel is accommodated in a rotatable manner in an exhaust gas conducting section, not illustrated in greater detail, of the exhaust turbocharger 3, said exhaust gas conducting section being capable of having a flow pass therethrough. Exhaust gas from an internal combustion engine, which engine is not illustrated in greater detail and is connected to the exhaust turbocharger 3 so as to be capable of having a flow pass therethrough, is applied via an inlet channel, not illustrated in greater detail, of the exhaust gas conducting section, to the turbine wheel, causing said turbine wheel to rotate.

By means of the conjoint-rotation connection, established with the aid of the shaft, to the compressor wheel 1, the compressor wheel 1 which is rotatably accommodated in an air conducting section, not illustrated in greater detail, is likewise caused to perform a rotational movement, wherein it takes in air and compresses it. The compressed air is supplied to the internal combustion engine via an outlet channel, not illustrated in greater detail, of the air conducting section.

The compressor wheel 1 comprises a plurality of rotor disk blades 5, by means of which it takes in air, which blades are arranged on a disk hub 6 of the compressor wheel 1. The disk hub 6 has a disk back 7 and a disk front, not illustrated in greater detail and remote from the disk back 7, of the disk hub 6. The plurality of rotor disk blades 5 are arranged on the disk hub 6 in a manner extending from the disk front to the disk back 7. Formed between in each case two blades of the plurality of rotor disk blades 5, a first blade 8 and a second blade 9, is a blade channel 10 comprising a channel base 11, along which the air flows.

In order to produce a particularly calm rotational movement of the rotor assembly 2, a balancing mark 12 is formed on the channel base 11 of the compressor wheel 1. The balancing mark 12 which is produced with the aid of a milling method is point-shaped, wherein a width B of the balancing mark 12 corresponds substantially to a length L of the balancing mark 12.

Figure 2:
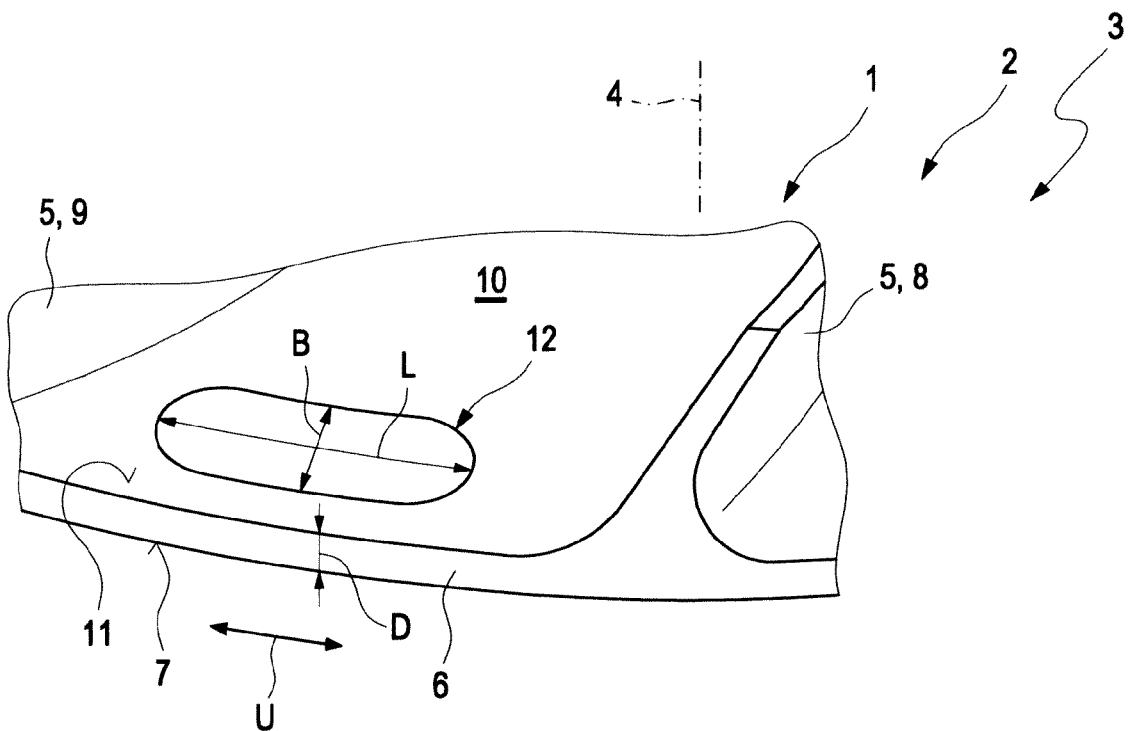
FIG. 2 shows a perspective view of a detail of a rotor disk in accordance with the invention.

FIG. 2 illustrates a rotor disk 1 in accordance with the invention which is likewise designed in the form of a compressor wheel. Likewise, the rotor disk 1 can also be designed in the form of a turbine wheel.

The balancing mark 12 is configured so as to extend over its circumferential extension direction U in the circumferential direction of the rotor disk 1 and is formed generally in the shape of a racetrack. The racetrack shape of a linear balancing mark 12 is formed by two semi-circles which are connected by a rectangle. The racetrack shape of a curved balancing mark 12 is formed by two semi-circles which are connected by an annular sector. The balancing mark 12 is notch-like, i.e. in other words it has been produced with material removal. Likewise, the balancing mark 12 can also be linear. The balancing mark 12 of the rotor disk 1 in accordance with the invention has a length L which is greater than the width B.

In order to produce the balancing mark 12 in so-called high-speed balancing, on the one hand the material-removing tool can be moved or on the other hand the rotor disk 1 or the rotor assembly 2 itself can be moved. The linear balancing mark 12 can be produced preferably by a moving tool, whereas the curved balancing mark 12 can be produced preferably with a moving rotor disk 1 or moving rotor assembly 2.

In order to effect sufficient removal of material which reduces the imbalance, a depth of the balancing mark 12 can also be increased, wherein it is necessary to take into account that the depth does not exceed a thickness D of the rotor disk 1 required for the strength of the rotor disk 1.

The advantage of the curved balancing mark 12 can be seen in the fact that a maximum equalization radius, and thus a maximum imbalance-related effect, of a rotor disk mass to be removed are ensured. However, in the case of the linear balancing mark 12, a straight racetrack segment is removed in the circular rotor disk 1, whereby the maximum equalization radius is achieved typically only at end points of the balancing mark 12.

In order to produce the balancing mark 12, basically any material-removing method can be used, in other words any material removal. In particular, grinding is feasible if the rotor disk 1 is designed in the form of a turbine wheel. Likewise, the material removal can also be achieved with the aid of a laser method. The balancing mark 12 could also be produced on an outer edge of the rotor disk 1 with the aid of a cutting method. The advantage of milling can be seen in terms of a possible surface treatment and cost advantage over other methods because milling can be used cost-effectively and flexibly.

In one exemplified embodiment, not illustrated in greater detail, the balancing mark 12 is configured extending at least partially in a radial direction over its length L. It is also possible for the balancing mark 12 to extend completely in a radial manner over its length L.

The invention claimed is:

1. A rotor disk for an exhaust turbocharger,
wherein the rotor disk has a disk hub with a plurality of rotor disk blades formed on the disk hub, and
wherein a balancing mark is arranged in a blade channel formed between a first blade of the plurality of rotor disk blades and a second blade, arranged adjacent to the first blade, of the plurality of rotor disk blades, and wherein a radially extending width of the balancing mark is less than a circumferentially extending length of the balancing mark, and wherein the width of the balancing mark is substantially constant over the length of the balancing mark, and wherein the balancing mark is curved.

2. The rotor disk as claimed in claim 1, wherein the balancing mark extends circumferentially on an arc at a constant radius from a center of the disk hub.

3. A method for balancing a rotor assembly which is mounted rotatably in a housing of an exhaust turbocharger, wherein the rotor assembly comprises a rotor disk which has a plurality of rotor disk blades on a disk hub of the rotor disk, and wherein formed between at least one first blade of the plurality of rotor disk blades and a second blade, adjacent to the first blade, of the plurality of rotor disk blades is a blade channel comprising a channel base, comprising:

forming a balancing mark in the channel base, the balancing mark having a circumferentially extending length greater than a radially extending width with the width of the balancing mark being substantially constant over the length of the balancing mark, by moving a tool in circumferential direction of the rotor disk.

4. The method as claimed in claim 3, wherein the balancing mark is produced by material removal.

5. A method for balancing a rotor assembly which is mounted rotatably in a housing of an exhaust turbocharger, wherein the rotor assembly comprises a rotor disk which has a plurality of rotor disk blades on a disk hub of the rotor disk, and wherein formed between at least one first blade of the plurality of rotor disk blades and a second blade, adjacent to the first blade, of the plurality of rotor disk blades is a blade channel comprising a channel base, the method comprising:

forming a balancing mark in the channel base, the balancing mark having a circumferentially extending length greater than a radially extending width with the width of the balancing mark being substantially constant over the length of the balancing mark, by circumferentially moving the rotor disk.

6. The method as claimed in claim 5, wherein the balancing mark is produced by material removal using a stationary milling tool.

\* \* \* \* \*